(12) United States Patent
Gottlieb et al.

(10) Patent No.: US 7,923,901 B2
(45) Date of Patent: Apr. 12, 2011

(54) SOLID-STATE ACTUATOR DRIVE APPARATUS

(75) Inventors: Bernhard Gottlieb, München (DE); Andreas Kappel, Brunnthal (DE); Tim Schwebel, München (DE); Carsten Wallenhauer, Schwarzheide (DE)

(73) Assignee: Noliac A/S, Kvistgaard (DK)

( * ) Notice: Subject to any disclaimer, the term of this patent is extended or adjusted under 35 U.S.C. 154(b) by 197 days.

(21) Appl. No.: 12/311,324

(22) PCT Filed: Sep. 18, 2007

(86) PCT No.: PCT/EP2007/059855
§ 371 (c)(1),
(2), (4) Date: Mar. 26, 2009

(87) PCT Pub. No.: WO2008/037633
PCT Pub. Date: Apr. 3, 2008

(65) Prior Publication Data
US 2010/0026140 A1      Feb. 4, 2010

(30) Foreign Application Priority Data

Sep. 26, 2006 (DE) .......................... 10 2006 045 293

(51) Int. Cl.
*H02N 2/00* (2006.01)
(52) U.S. Cl. .................... 310/328; 310/12.01; 310/12.04
(58) Field of Classification Search .............. 310/12.01, 310/12.04, 328
See application file for complete search history.

(56) References Cited

U.S. PATENT DOCUMENTS

| | | | |
|---|---|---|---|
| 4,814,660 A | 3/1989 | Yamada et al. | |
| 5,079,471 A | 1/1992 | Nygren, Jr. | |
| 6,411,536 B1 * | 6/2002 | Thor et al. | ............ 363/141 |
| 6,664,710 B1 | 12/2003 | Gottlieb et al. | |
| 2001/0038258 A1 | 11/2001 | Fischer et al. | |

FOREIGN PATENT DOCUMENTS

| | | |
|---|---|---|
| DE | 1 613 087 | 1/1971 |
| DE | 94 14 601 U1 | 11/1995 |
| DE | 10 2005 022 355 A1 | 11/2006 |
| DE | 10 2006 032 993 A1 | 1/2008 |
| DE | 10 2006 032 995 A1 | 1/2008 |
| DE | 10 2006 032 996 A1 | 1/2008 |
| WO | 97/26702 | 7/1997 |

* cited by examiner

*Primary Examiner* — Thomas M Dougherty
(74) *Attorney, Agent, or Firm* — Staas & Halsey LLP

(57) ABSTRACT

A solid-state actuator drive apparatus has—a shaft, —a pivot bearing for supporting the shaft, —a drive body, —at least two actuators for the excitation of the drive body and the shaft relative to each other for causing the shaft to rotate relative to the drive body, and—a base element, on which these components are attached. Either the drive body is configured such that it has a drive body opening, and the shaft at least leads into the drive body opening, —or the shaft is configured as a hollow shaft, and an element of the drive body having an annular or discoid circumference is disposed therein. The drive body is disposed stationary relative to the base element. The shaft is disposed in the pivot bearing and is adjustably disposed in the radial direction of the shaft relative to the base element by the solid-state actuators.

18 Claims, 3 Drawing Sheets

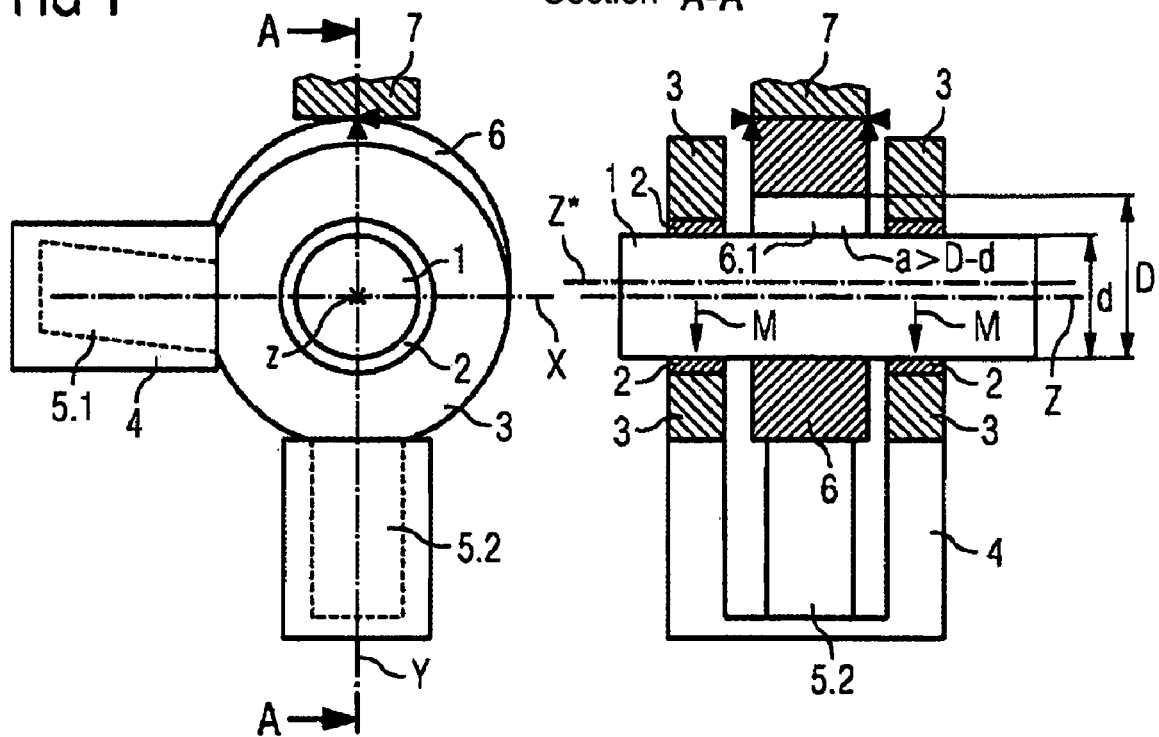
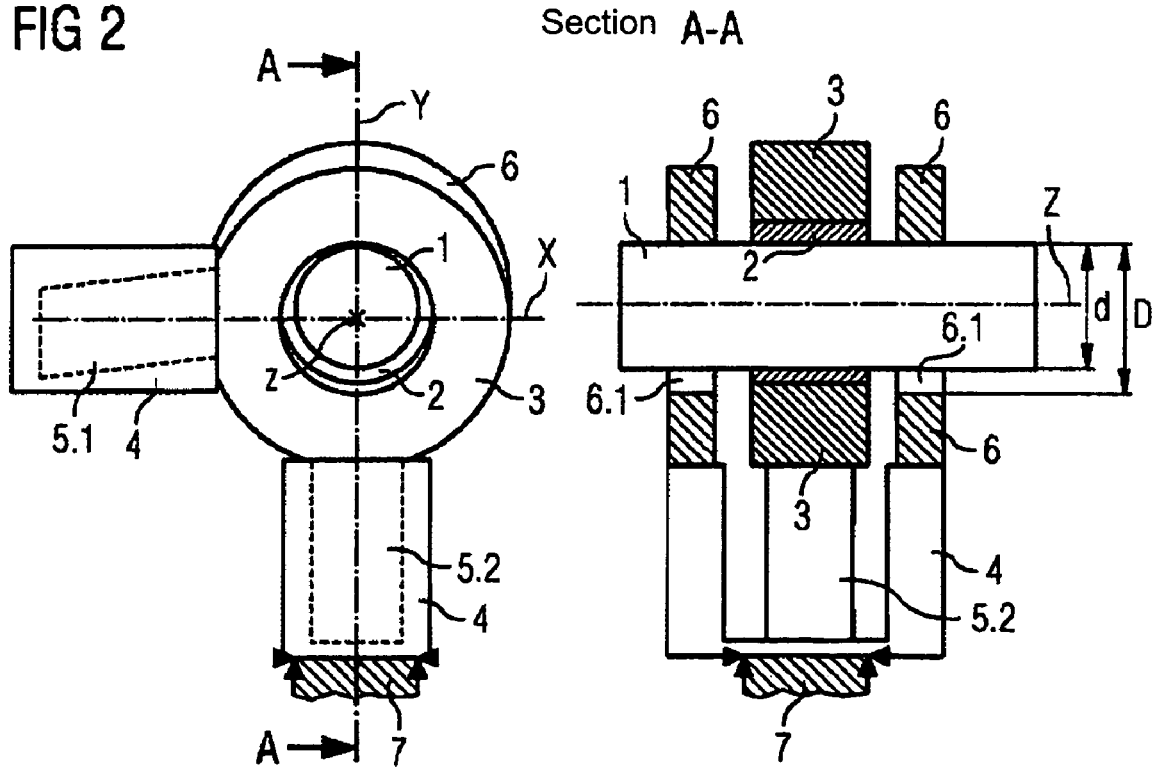

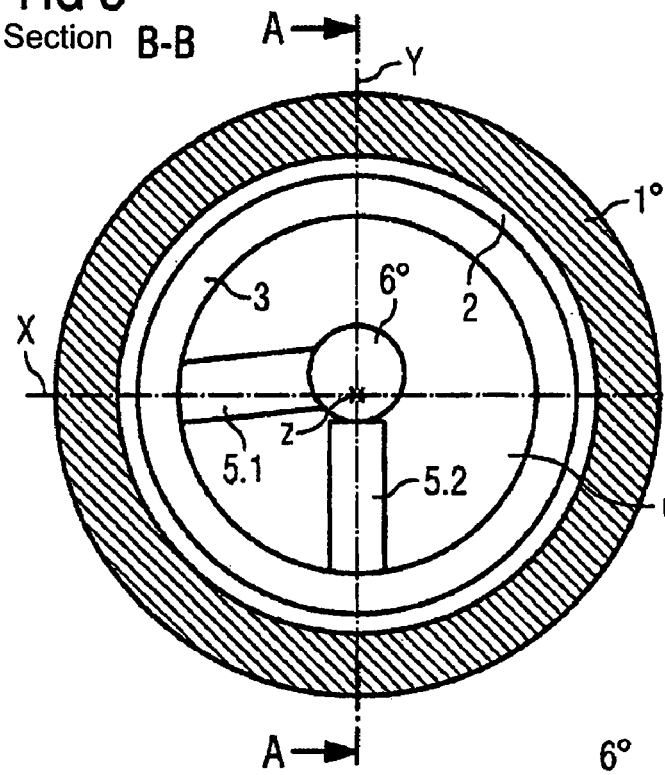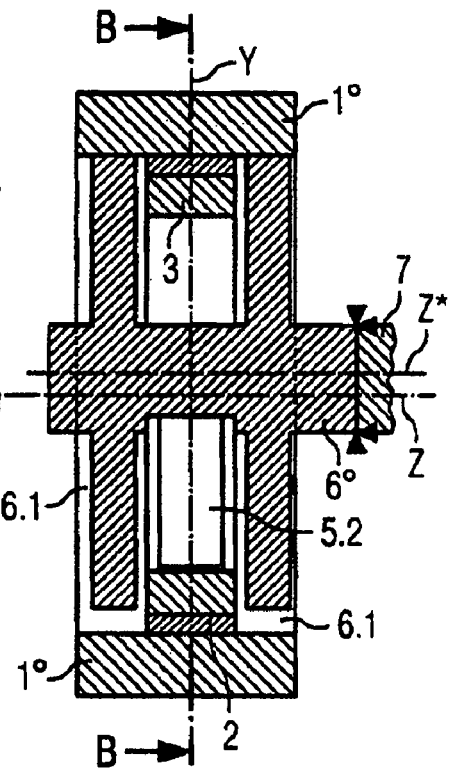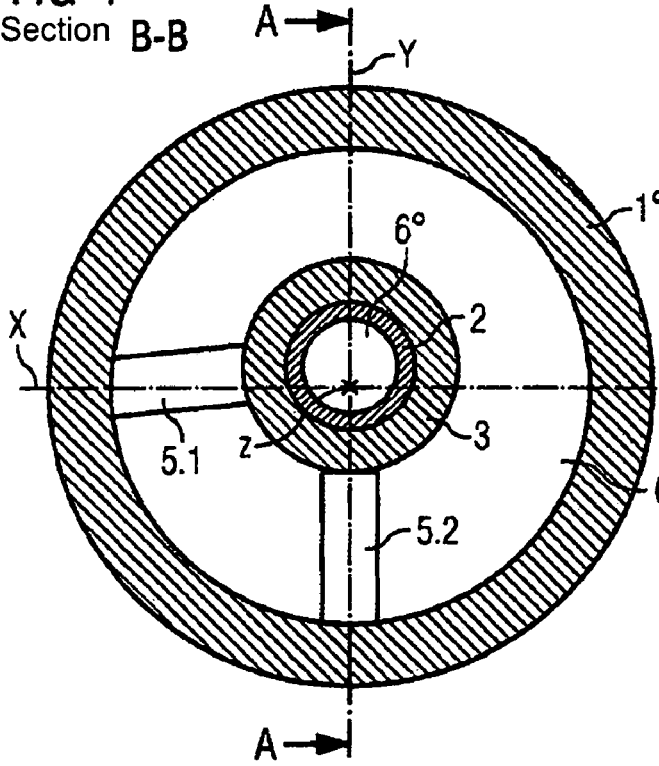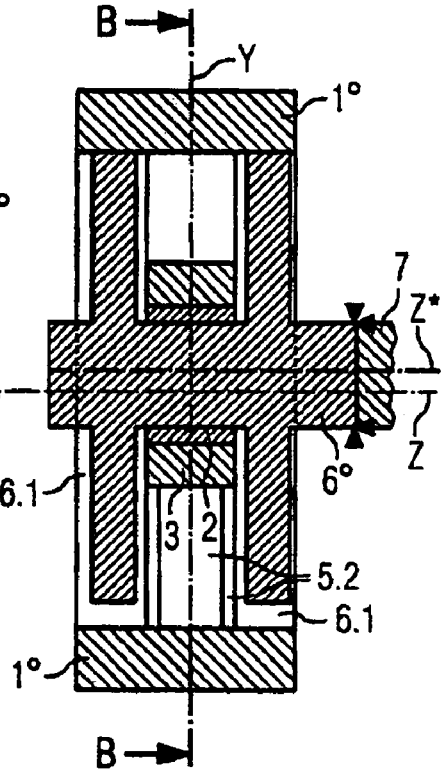

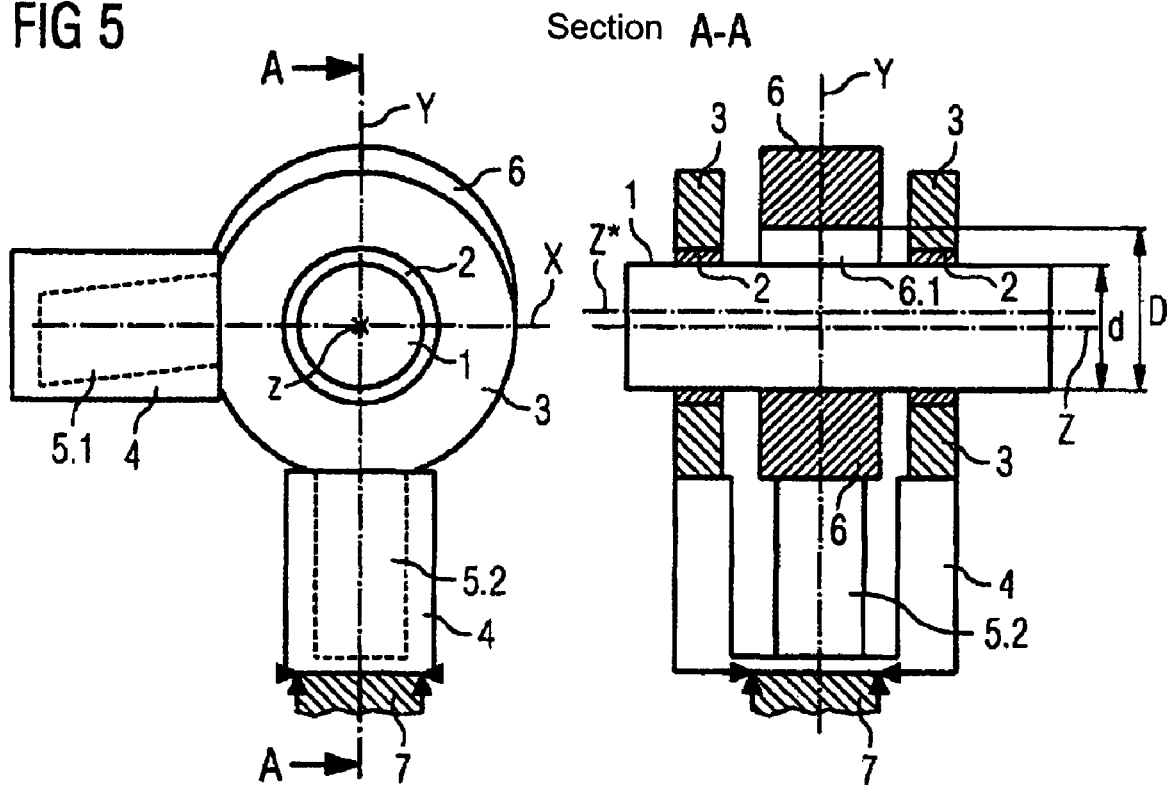
Related Art

SOLID-STATE ACTUATOR DRIVE APPARATUS

CROSS REFERENCE TO RELATED APPLICATIONS

This application is based on and hereby claims priority to PCT Application No. PCT/EP2007/059855 filed on Sep. 18, 2007 and German Application No. 10 2006 045 293.3 filed on Sep. 26, 2006, the contents of which are hereby incorporated by reference.

BACKGROUND OF THE INVENTION

An electromechanical motor with a solid-state actuator drive apparatus is disclosed in EP 1 098 429 BI. A rotatably mounted shaft with a first diameter is encompassed by a drive body with a drive body opening in the form of a cylindrical hole. A shaft surface of the shaft is able to roll on the inner surface of the drive body opening, which has a second diameter which is somewhat larger than the first diameter. At the same time, a shaft axis of the shaft and a central axis of the drive body opening are aligned parallel to one another. The rolling movement and therefore the rotation of the shaft are brought about by a circular sliding movement of the drive body or its axis parallel to the shaft axis. In the simplest case, the circular relative movement between the axis of the drive body opening and the shaft axis is produced by two electromechanical actuators in the form of linear actuators, which in particular can be driven independently of one another and the active directions of which, i.e. directions of the utilized change in length, are orthogonal to one another. In the simplest case, the actuators are disposed so that the active directions span a plane perpendicular to the shaft axis or annular hole axis. By a suitable electrical control of the actuators, one of the actuators is excited to produce a sinusoidal deflection and the other actuator to produce a cosinusoidal deflection with the same frequency and amplitude as a function of time. In doing so, the magnitude of the amplitude of the deflection exceeds one-half of the diameter difference of the first and second diameter, thus reliably overcoming the diameter difference between the drive body opening and the shaft. As long as the linear movements of the two linear actuators are superimposed on one another independently, in total the drive body and shaft are displaced with respect to one another in a circular manner and the rotatably mounted shaft rotates.

If a torque load is applied to the shaft, then a force is transmitted between drive body and shaft, which, in the embodiment described, is by friction. The force transmission can be improved by introducing gearing. As, in this case, no further slip can occur, in addition a very high positioning accuracy and reproducibility of the positioning process is achieved.

The basic design of an embodiment according to the related art is shown in a highly abstract form in FIG. 5. In this case, the force can be transmitted between drive body opening and shaft by friction or by positive locking.

A shaft 1 is rotatably mounted by two radially rigid pivot bearings 2, e.g. sliding bearings, ball bearings or needle bearings, in a bearing holder 3 in each case. The two bearing holders 3 are rigidly connected by two bridge elements 4. Each bridge element 4 provides a mounting for an actuator. The two actuators 5.1, 5.2 are described in the following as X-actuator for a movement in a first direction X perpendicular to a shaft axis Z, and as Y-actuator for a movement in a second direction Y perpendicular to the shaft axis Z and perpendicular to the first direction X. The two actuators 5.1, 5.2 are rigidly mechanically connected to the associated bridge elements 4 on the mounting side. In practical motor design, the functional elements, i.e. the bearing holders and bridge elements, are preferably formed as part of a single-part or multi-part motor housing. A mechanically rigid connection, symbolized by triangles, of one of the bridge elements 4 to a motor holder (not shown), such as a frame or machine bed for example, is therefore correspondingly to be understood as a fixing to a motor housing or carrier element. At their drive ends, the actuators 5.1, 5.2 are mechanically rigidly connected to a drive body 6 with a drive body opening 6.1 in the form of a cylindrical hole. The shaft 1 feeds through or into the drive body opening 6.1.

With such an embodiment, in motor operation, the motor housing with the pivot bearings 2 and the shaft 1 can be considered to be quiescent with regard to translation, and the drive body 6 as moving.

FIG. 5 shows the instantaneous situation in which the Y-actuator 5.2 is just at its maximum deflection and the drive body 6 in the drawing rests against the bottom of the shaft 1. In the left-hand illustration, a plan view, the hidden X-actuator 5.1 is therefore shown distorted. This representation is deliberately greatly exaggerated in order to illustrate the principle. For solid-state actuators used as actuators in practice, an actuator deflection only reaches about 1-2 per mil of the actuator length. With a currently typical actuator length of ca. 30 mm, a maximum of a=60 μm actuator deflection is achieved. Taking into account the necessary assumption that the actuator deflection a must exceed the diameter difference between a second diameter D of the drive body opening 6.1 and a shaft diameter d of the shaft 1, i.e. a>(D−d), it becomes clear that the "bending" of the actuators 5.1, 5.2 perpendicular to their active direction remains negligibly small.

Torques of up to 2 Nm have already been taken off and measured at the shaft 1 in electromechanical motors of this design using a positively locked force transmission between drive body 6 and shaft 1. In this case, the load torque is transmitted by the shaft 1 to the drive body 6, in particular by positive locking, passes from here via the actuators to the motor housing or the bridge elements, and is finally dissipated at the motor holder 7. As the shaft 1 is rotatably mounted in the motor housing and is fitted in the bearing holders, torque cannot as a basic principle be transmitted at the bearing points.

Consequently, the whole load of an active torque M must be absorbed and dissipated by the actuators 5.1, 5.2. As a result, the actuators 5.1, 5.2 are subject to considerable bending. Many known and new actuator materials, and in particular currently used ceramic piezoelectric multi-layer actuators, are mechanically brittle in their behavior. With high torque loads in particular, cracks can therefore initially form in the actuator material with subsequent failure due to breakage.

The bending load is accompanied by the fact that part of the actuator material is subjected to tensile stress and part of the actuator material is subjected to compressive stress. Tensile stresses in particular are highly damaging to brittle actuator materials, such as piezoceramic materials for example. In contrast with this, these materials have a high strength and loading capability with respect to compressive stress.

A first approach to a solution to such a problem relates to an arrangement of linear actuators in pairs, as described in the not yet published DE 10 2005 022 355. Here, a reduction in the mechanical stress in the actuators brought about by torque loads is achieved by increasing the area moment of inertia of the actuator arrangement.

A further approach, which likewise uses the increase in the appropriate area moment of inertia, is described in the not yet published DE 10 2006 032 993 as a design of a production-oriented unit for driving piezoelectric ring motors by piezoelectric multi-layer actuators with rectangular cross section.

Further approaches are concerned with the efficient provision of a high mechanical compressive stress for the actuators, wherein however the compressive stress must not or must only insignificantly hinder their deflection. The compressive stress provided must exceed superimposed components of mechanical tensile stress which occur in operation, so that in total no damaging tensile stress can occur in the actuator material in any conceivable operating state. Such approaches are described in the not yet published DE 10 2006 032 995 in the form of a pre-stressing system for production-oriented mechanical compressive stressing of the piezo actuators in the piezoelectric adjustment drive, and in the not yet published DE 10 2006 032 996 in the form of a circumferential spring wire for production-oriented mechanical compressive stressing of the piezo actuators in the piezoelectric adjustment drive.

SUMMARY

One possible object relates to providing a design of a solid-state actuator drive apparatus, which reduces or completely prevents the bending loading of the in particular mechanically brittle actuators brought about by torque loads on the motor shaft.

The proposed actuator is based on the fact that torque loads acting on the shaft are directly transmitted to the drive body or the motor housing, bearing holder, bridge elements etc. and are directly transferred from there to a motor holder, e.g. a frame or a machine bed. In doing so, the actuators are advantageously kept out of the chain of torque-transmitting elements by suitably disposed pivot bearings.

Accordingly, a solid-state actuator drive apparatus is preferred which comprises a shaft, a pivot bearing for supporting the shaft so that it is radially rigid and can easily rotate, a drive body, at least two actuators for the excitation of the drive body and the shaft relative to one other for causing the shaft to rotate relative to the drive body, and a base element, on which these components are fixed, wherein, according to one embodiment, the drive body is configured such that it comprises a drive body opening and the shaft at least feeds into the drive body opening, or, according to another embodiment, the shaft is configured as a hollow shaft and an element of the drive body having an annular or discoid circumference is disposed therein. In doing so, the drive body is disposed so that it is stationary relative to the base element. The shaft is disposed relative to the solid-state actuators by the pivot bearing so that it can easily rotate and can be adjusted by the solid-state actuators relative to the base element in the plane perpendicular to the shaft axis or in the radial and tangential direction of the shaft. At the same time, the driving directional component lies in the plane perpendicular to the shaft axis, wherein wobbling movements can possibly occur due to a fixed rotational mounting of an element driven by the shaft.

It is advantageous with such a solid-state actuator drive apparatus that no torque loading, or at the most only a low torque loading, acts on the actuators. In return, an at first glance deviant shaft vibration or transverse movement of the shaft in its radial direction must be accepted. However, on closer inspection, it can be seen that the transverse movements of the shaft are so small that they are negligible or can be compensated for. A decisive advantage is that the bending load, and in particular the associated highly damaging tensile stresses in parts of the actuator material brought about by torque loads acting on the shaft and which in the related art are transferred to the actuators, are avoided here as a basic principle by the actuators being decoupled from a torque load on the shaft by a rotational mounting relative to the shaft. Torque loads on the shaft can no longer act on the actuators in such a way that the actuators become too severely damaged or even destroyed with time.

It is also advantageous with such a solid-state actuator drive apparatus that the actuators do not rotate relative to the base element, as a result of which the electrical connection of the actuators is simplified.

Also particularly preferred is an embodiment based on a solid-state actuator drive apparatus having a shaft, a pivot bearing, a drive body, at least two actuators for the excitation of the drive body and the shaft relative to one another for causing the shaft to rotate relative to the drive body, and a base element on which these components are fixed, wherein either the drive body is configured such that it comprises a drive body opening and the shaft at least feeds into the drive body opening, or the shaft is configured as a hollow shaft and an element of the drive body having an annular or discoid circumference is disposed therein, and wherein the drive body is disposed so that it is stationary relative to the base element, the actuators and/or the shaft which is disposed thereon in particular so that it can rotate with them are disposed on the pivot bearing and can be rotated relative to the drive body, and the shaft is disposed so that it can be adjusted in a radial direction of the shaft relative to the base element by the actuators. According to this further modified embodiment, on the one hand, the actuators are in particular rigidly connected to the shaft and, on the other, are rotatably mounted relative to the base element. As a result, the actuators are also torque-free, but rotate with the shaft.

The general basic idea of the different embodiments resides in that the one or possibly also several drive bodies are disposed so that they are stationary relative to a base element, and the shaft is disposed so that it can be adjusted relative to the base element, while accepting a transverse movement of the shaft.

Particularly preferred is such a solid-state actuator drive apparatus in which the drive body is securely fixed to the base element. In other words, the drive body is disposed in a fixed position relative to a base element, preferably and optionally screwed, welded or securely fixed in some other way to such a base element while interposing further rigid elements.

Advantageous are two drive bodies, each with a drive body opening, wherein the shaft acts together with the two drive bodies. With such an arrangement, the two drive bodies, or possibly even more drive bodies, are accordingly disposed so that they are stationary relative to the base element. With such an arrangement, it is advantageous that a drive force acts on the shaft at two points at a distance from one another in the longitudinal direction of the shaft, resulting in a stable and preferably tilt-free driving of the shaft.

The two drive bodies are preferably connected to one another by a connecting element and fixed to the base element by the connecting element. Advantageously, such an embodiment provides a fixed arrangement of the two drive bodies relative to one another and, at the same time, the possibility of fixing the two drive bodies to a common base element so that they are spaced apart and parallel to one another.

Preferably, two pivot bearings are used, which are coupled by at least one of the actuators to at least one such drive body in each case. Advantageously, two or more such pivot bearings make it possible to feed the shaft through two pivot bearings which are spaced apart from one another so that it is tilt-free. The two pivot bearings are preferably connected to one another by a connecting element and coupled to the drive body via the connecting element by the actuators.

Advantageous is such a solid-state actuator drive apparatus having a detection device for determining a torque acting on the shaft by taking off loads acting linearly on the actuators. Although a direct torque transmission to the actuators is advantageously avoided by the different embodiments, surprisingly a torque determination of a torque acting on the shaft can be carried out in spite of this. As a result, for example, the control unit can determine loads acting linearly on the actuators by a suitable algorithm, for which purpose control currents or control voltages, which if necessary are impressed on the actuators, are removed from the calculation in order to be able to deduce such a torque by values ultimately determined in this way. The detection device is therefore advantageously implemented by the actuators and the control unit provided for the activation or, if necessary, also by a separate circuit or control arrangement.

Preferred is such a solid-state actuator drive apparatus having a coupling device, which is disposed between the shaft and an element to be driven by the shaft, wherein the coupling device is configured to transmit a rotational movement between the shaft and the element to be driven and to decouple a movement of the shaft in the radial direction. Advantageously therefore, by such a coupling device, the transverse movement of the shaft relative to the base element is decoupled when transmitting to the element to be driven by the shaft, so that the element to be driven does not also execute such a transverse movement. A coupling device can be easily implemented, for example by a bellows coupling which is known in itself.

In particular, the base element is a housing of a drive apparatus or a frame, wherein the housing or frame securely connects the drive body to a superimposed apparatus.

Functionally therefore, an electromechanical motor is provided on the operating principle of a solid-state actuator drive apparatus, in which a torque load on the drive element is transmitted via the shaft or hollow shaft directly to a motor holder in the form of the base element. It is advantageous here that the actuators are not located in the torque transmission path. Advantageously, only radial forces can be transmitted to the drive shaft or drive element due to the interaction of the actuators and at least one pivot bearing.

Preferably, a decoupling of the transverse movement of the drive element, that is to say of the shaft or hollow shaft for transmitting the rotation between the shaft and the element to be driven, is provided by a bellows coupling for example.

As well as solid-state actuators in multi-layer PMA design, embodiments with different types of solid-state actuators can also be used, for example magnetorestrictive, electrorestrictive or electromagnetically acting solid-state actuators.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows schematically components of a preferred solid-state actuator drive apparatus with solid-state actuators in plan view and in side sectional view according to a first embodiment, FIG. 2 shows schematically components of a preferred solid-state actuator drive apparatus with solid-state actuators in plan view and in side sectional view according to a second embodiment, FIG. 3 shows schematically components of a preferred solid-state actuator drive apparatus with solid-state actuators in plan view and in side sectional view according to a third embodiment, FIG. 4 shows schematically components of a preferred solid-state actuator drive apparatus with solid-state actuators in plan view and in side sectional view according to a fourth embodiment, and FIG. 5 shows schematically components of a preferred solid-state actuator drive apparatus with solid-state actuators in plan view and in side sectional view according to an embodiment of the related art.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

As can be seen from FIG. 1, an example of a solid-state actuator drive apparatus wherein a plurality of individual components, wherein the components shown can be supplemented by further components or replaced by similarly acting components of a different design.

The solid-state actuator drive apparatus has a housing or frame 7, which is sketched only schematically and accommodates or carries the other components. A shaft 1 is disposed in the housing by a bearing arrangement, wherein a shaft axis Z of the shaft 1 extends out of the housing in an axial direction. A drive apparatus is used to cause the shaft 1 to rotate about the shaft axis Z.

The drive apparatus includes two or more linearly acting actuators 5.1, 5.2, preferably in the form of solid-state actuators, and a drive body 6. Furthermore, the drive apparatus has a bearing holder 3 and one or more pivot bearings 2.

In the embodiment shown, the bearing holder 3 is constructed from a U-shaped element, which is open at the side and simultaneously forms a connecting element, wherein the two parallel legs of the bearing holder 3 run radially with respect to the shaft axis Z. The two pivot bearings 2 through which the shaft 1 feeds are disposed in the bearing holder 3. The shaft 1 is therefore rotatably mounted in the bearing holder 3 in at least one pivot bearing 2, preferably in two pivot bearings 2 for stabilization against tilting, but fixed in its radial direction.

The drive body 6 has a circular drive body opening 6.1, which in particular is configured as a through opening through the drive body 6. The shaft 1 feeds through the drive body opening 6.1 or at least into the drive body opening. An outside diameter of the shaft 1 as a first diameter d is here less than an inside diameter of the drive body opening 6.1 as a second diameter D. The ratio of the two diameters d, D is such that a maximum actuator deflection a of the actuators 5.1, 5.2 is greater than the difference of the two diameters, that is to say $a > (D-d)$. In order to drive the shaft 1 by the actuators 5.1, 5.2, the drive body 6 is displaced in such a way that a shaft outer wall of the shaft 1 is preferably continuously in frictional contact with a drive body inner wall so that by suitably controlling the drive body 6 by the actuators 5.1, 5.2, the drive body is set in motion which causes the shaft 1 to rotate.

In order to drive the actuators 5.1, 5.2, the solid-state actuator drive apparatus has a control unit C in the form of an integral or if necessary also as an independent external component. In the usual way, the control unit C is connected to the actuators 5.1, 5.2 by leads in order to apply charges or voltages to the actuators 5.1, 5.2 depending on the design, so that the actuators 5.1, 5.2 linearly extend and/or contract in their longitudinal direction according to the control.

The actuators 5.1, 5.2 are disposed as a connecting member between the drive body 6 and the bearing holder 3 in such a way that the shaft 1 is set in translatory, pseudo-circular motion relative to the drive body 6 via the bearing holder 3 and the pivot bearings 2. In other words, as a result of suitable activation of the actuators 5.1, 5.2, the shaft axis Z of the shaft 1 rotates about a drive body opening axis Z* which runs parallel to the shaft axis Z and forms a central axis through the drive body opening 6.1. Unlike known embodiments however, the bearing holder 3 with the pivot bearings 2 is not securely connected to the frame 7 or housing, but in the different embodiments the drive body 6 is securely connected to the frame 7.

In summary, an important aspect of the design of such a preferred solid-state actuator drive apparatus relates to a frame 7, to which the drive body 6 is securely fixed, and the actuators 5.1, 5.2 which fix the bearing holder 3 adjustably to the drive body 6 for mounting the shaft 1. As a result, the drive body 6 is disposed in a fixed position on the frame 7, while the shaft 1 executes a small rotational or vibrational movement relative to the drive body 6 and therefore also relative to the frame 7.

Expediently, the actuators 5.1, 5.2 are disposed between the drive body 6 and the bearing holder 3 by a fixed connection to both the drive body 6 and also to the bearing holder 3. Preferably, in doing so, the actuators 5.1, 5.2 are fixed to a section of the bearing holder 3 which runs parallel to the shaft axis Z. However, other embodiments can also be implemented in which the actuators 5.1, 5.2 are not necessarily disposed securely fixed between the drive body 6 and the bearing holder 3, but are inserted loosely between them. Such an arrangement is possible, for example, when more than two actuators 5.1, 5.2 are disposed between the bearing holder 3 and the drive body 6 in such a way that only the extending movement of the actuators 5.1, 5.2 is used to drive the drive body 6 relative to the pivot bearings 2 or relative to the bearing holder 3 in each case.

FIG. 1 therefore shows in a highly abstract form the design of a first embodiment, which differs significantly from the related art shown in FIG. 5 only by the change to the holding condition, symbolized by black triangles. Here, the preferred drive body 6 can be seen as quiescent, whereas the base element 7, e.g. in the form of a motor housing, bearing holder, or bridge element, is moved with the pivot bearings 2 and the shaft 1 relative to the drive body 6 by the actuators 5.1, 5.2 designed in the form of linear actuators.

It can be perceived as troublesome that the shaft 1, which can be used as a motor shaft, is not quiescent, but is excited by the actuators 5.1, 5.2 to produce a circular sliding movement parallel to the motor axis, i.e. in particular parallel to the drive body opening axis Z*. However, if it is taken into account that, in the extreme case of actuator deflection a in current applications, the sliding distance is at most up to 200 μm, then it becomes clear that the problem of the sliding movement of the shaft 1 can easily be rectified by simple measures for decoupling vibration of the shaft 1 from the element to be driven. This can easily be implemented, for example, by a coupling device in the form of a bellows coupling which is transversely soft but rigid with respect to torsion. Where dimensions are specified, these are not intended to impose any limitation on further implementable embodiments with dimensions that deviate therefrom.

With this design, the pivot bearings 2 prevent a load torque M acting on the shaft 1 from being transmitted to the actuators 5.1, 5.2. As a result, bending stresses on the actuators are reliably or at least sufficiently reliably prevented.

In the further embodiment according to FIG. 2, the arrangement according to FIG. 1 is modified in such a way that the shaft 1 does not feed through the drive body opening 6.1 of a single drive body 6, but through the drive body openings 6.1 of two drive bodies 6, which are spaced apart from one another. In this embodiment, the shaft 1 is mounted in only a single pivot bearing 2, which is disposed in the bearing holder 3. Accordingly, the bearing holder 3 is not formed from a U-shaped element, but in a simple form from a square or circular element for example. The two drive bodies 6 are securely connected to one another by a bridge element 4 so that they execute a uniform movement about a common drive body opening axis Z*. The drive body 6 is in turn coupled to the bearing holder 3 by actuators 5.1, 5.2, wherein, in the embodiment shown, the actuators 5.1, 5.2 are disposed between an outer wall of the bearing holder 3 and an opposite wall of the bridge element 4. In this embodiment, the drive bodies 6 are likewise securely fixed in position to a frame 7, wherein the connection to the frame 7 is made by the bridge element 4 as a connecting element for example.

FIG. 2 therefore shows a second embodiment of an electromechanical motor which can be designed in this way. Here, the shaft 1 is mounted by such a pivot bearing 2 in a bearing holder 3 so that it is radially stiff but is able to rotate. The shaft 1 with its diameter d as the first diameter is encompassed by two drive bodies 6 each with a drive body opening 6.1 configured in the form of an annular hole, for example, with a slightly larger hole diameter than the second diameter D. The drive bodies 6 are mechanically rigidly connected by two bridge elements, for example, as the connecting element 4. At the same time, one bridge element constitutes a mounting for the actuator 5.1 which is disposed and acts as an X-actuator in the X-direction perpendicular to the shaft axis Z, and the other bridge element constitutes a mounting for the actuator 5.2 which is disposed and acts as a Y-actuator in the Y-direction perpendicular to the X-direction and perpendicular to the shaft axis Z.

The functional elements, i.e. the drive bodies 6 and the bridge elements, can be configured as integral components of a single or multi-part motor housing. The linear actuators 5.1, 5.2 are preferably mechanically rigidly connected to the bearing holder 3 at the drive end. By suitable activation of the electromechanically acting actuators 5.1, 5.2, the shaft 1 is displaced relative to the drive bodies 6 in the form of a circular sliding movement, as a result of which the outside diameter of the shaft 1 rolls in the drive body openings 6.1. As a result, the shaft 1 is rotated. In the case of a friction-coupled arrangement, the maximum actuator deflection a, which corresponds to twice the amplitude of the deflection, must exceed the diameter difference of the two diameters D, d. In this case, the force is transmitted between the drive bodies 6 and the shaft 1 by friction. To improve the force transmission and to prevent slip, gearing can be introduced between the rings and the corresponding sections of the shaft.

In this case, the motor is mechanically connected to the motor holder by the motor housing, again symbolized by the triangles on one of the connecting elements. The fixing element 7, in the form of a motor housing for example, can therefore be considered to be quiescent. The shaft 1 and the bearing holder 3 are moved relative thereto. In order to decouple vibrations, the shaft 1 is preferably coupled to the element to be driven by a transversely soft but torsionally stiff coupling element, such as a bellows coupling for example.

A load torque acting on the shaft 1 is transmitted by friction or positive locking to the drive bodies 6 or to the fixing element, and from there passed on directly to the motor holder. Thanks to the rotational mounting between the shaft 1 and the bearing holder 3, no torque can be transmitted from the shaft 1 to the housing via the actuators 5.1, 5.2. The linearly acting actuators 5.1, 5.2 are therefore not subjected to bending due to torque loads on the shaft 1.

As an advantage compared with the first version, this second motor version has a quiescent motor housing. In the second version, the moving mass is ideally considerably less, and the vibrational excitation with regard to the motor mounting is therefore ideally also less.

FIG. 3 shows a further modified embodiment in which a shaft 1° is configured in the form of a hollow shaft or in the shape of a bell. One or more drive bodies 6° are disposed within the shaft 1°. Such a drive body 6° has at least one annular or discoid element 6.1, the diameter of which, as a first diameter d°, is slightly less than an inside diameter of the shaft 1, which serves as a second diameter D°. The shaft 1° is again set in translatory motion relative to the drive body 6° by two or more actuators 5.1, 5.2. For this purpose, the actuators 5.1, 5.2 are placed between a section of the drive body 6°, which runs parallel to the shaft axis Z, and a bearing holder 3 for mounting a pivot bearing 2. Particularly in the case of an arrangement of three or more actuators 5.1, 5.2, these do not especially have to be securely connected to the drive body 6° and the bearing holder 3, even though a secure connection is preferred. With this arrangement, the pivot bearing 2 sits outside around the bearing holder 3 in a guiding manner between the bearing holder 3 and the shaft 1°, which is configured as a hollow shaft.

As an important aspect, in this embodiment, the drive body 6° is also securely fixed in position to a frame 7, which carries the whole arrangement.

With this embodiment, a motor version is therefore presented which has actuators 5.1, 5.2 lying within the drive body 6°, in which the outer surface of the drive body 6° drives a drive bell housing, which is connected to a shaft 1° and which itself forms a hollow shaft.

The version based thereon is configured with linearly acting electromagnetic actuators 5.1, 5.2 lying within a cylindrical drive bell housing or shaft 1°, i.e. within its inside diameter as second diameter D. On the bearing side, the actuators 5.1, 5.2 are mechanically rigidly fixed to a stator 3, which is configured as an independent component or as an annular or discoid element 6.1 of the drive body 6°. The motor configured in this way is fixed by the stator, symbolized by triangles, to a motor holder (not shown), e.g. a frame or machine bed. The stator has at least one cylindrical disc, for reasons of symmetry preferably two cylindrical discs, with an outside diameter, which in this case serves as a first diameter d, and which is chosen to be only slightly smaller than the inside diameter of the drive bell housing or shaft 1°. The shaft 1° is mounted on the bearing holder 3 by the pivot bearing 2 so that it is radially stiff but can be rotated. At their drive end, the electromechanically acting actuators 5.1, 5.2 are mechanically rigidly connected to the bearing holder 3. By suitable activation of the linear actuators, the shaft 1° with the bearing holder 3 and the pivot bearing 2 is displaced in a circular manner so that the inner surface of the shaft 1° rolls on the cylindrical outer surfaces of the stator discs with its diameter D and is therefore caused to rotate.

When the force is transmitted by friction, the diameter difference between the inside diameter of the drive bell housing and the outside diameter of the stator discs must again be less than the maximum actuator deflection $a > (D-d)$. The force is then transmitted between the inner surface of the shaft 1° and the outer surface of the disc by friction. If gearing is fitted, a positive locking can also be achieved with the known advantages of an improvement in the force transmission and the guaranteeing of freedom from slip.

The rotational movement of the motor configured in this way is taken off at the drive bell housing or shaft 1°. The circular sliding movement of the shaft 1° which is superimposed upon the rotation can easily be suppressed by usual measures for decoupling vibration, such as for example the use of a transversely soft but torsionally stiff bellows coupling between the drive bell housing or shaft 1° and the element to be driven.

If a load torque is applied to the shaft 1°, then this is transmitted to the motor mounting via the stator discs. Because of the pivot bearing 2, the actuators 5.1, 5.2 remain free from torque and are therefore not subjected to bending load or not to a too severe bending load. A multitude of other variations are also possible, which are based on the same basic design. For example, the shaft can be fixed to the base element by the solid-state actuators so that it is adjustable relative to the base element in the radial direction of the shaft, and in addition the drive body can likewise be fixed directly to the base element. In such a case, a connecting element is omitted or the base element itself forms the connecting element.

Furthermore, the pivot bearings do not have to be configured as an independent element, but can be functionally configured by appropriate design of a bracket or end section of the actuators for example.

FIG. 4 shows schematically components of a preferred solid-state actuator drive apparatus with solid-state actuators in plan view and in side sectional view according to a fourth embodiment, which builds on the third embodiment. The difference resides in both the shaft 1° and the actuators 5.1, 5.2 being jointly and rotationally rigidly disposed with respect to one another on the pivot bearing 2. Both the shaft 1° and the actuators 5.1, 5.2 therefore rotate relative to the drive body 2°. In this case, the current or voltage connection of the actuators to a control unit is made inductively or via sliding contacts for example.

According to further embodiments, the principle of the actuators rotating with the shaft can also be transferred to the concept of the first exemplary embodiments. In principle, an implementation is even possible in which the actuators are rotatably mounted with respect to the shaft by a first pivot bearing and with respect to the drive body by a second pivot bearing.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A solid-state actuator drive apparatus comprising:
   a shaft having a shaft axis;
   a pivot bearing for supporting the shaft so that the shaft can rotate;
   a drive body;
   at least two actuators to excite the drive body and the shaft relative to one other to cause the shaft to rotate relative to the drive body; and
   a base element, on which the shaft, the pivot bearing, the drive body and the actuators are fixed, wherein
   either the drive body has a drive body opening and the shaft feeds into the drive body opening or the shaft is a hollow shaft, the drive body has an annular or discoid circumference and is disposed in the hollow shaft, the drive body is stationary relative to the base element, and the shaft is positioned in the pivot bearing so that the actuators can change a position of the shaft relative to the base element in a plane perpendicular to the shaft axis of the shaft.

2. The solid-state actuator drive apparatus according to claim 1, wherein the drive body is securely fixed to the base element.

3. The solid-state actuator drive apparatus according to claim 1, wherein the drive body has two drive elements, each having a drive body opening, and the shaft acts together with the two drive elements.

4. The solid-state actuator drive apparatus according to claim 3, wherein the two drive body elements are connected to one another by a connecting element and are fixed to the base element by the connecting element.

5. The solid-state actuator drive apparatus according to claim 1, wherein the pivot bearing has two pivot bearing elements, and each pivot bearing element is coupled to the drive body by at least one of the actuators.

6. The solid-state actuator drive apparatus according to claim 5, wherein the two pivot elements are connected to one another by a connecting element and are movably coupled to the drive body via the connecting element and the actuators.

7. The solid-state actuator drive apparatus according to claim 1 further comprising a detection device to determine a torque acting on the shaft by determining loads acting linearly on the actuators.

8. The solid-state actuator drive apparatus according to claim 1, further comprising a coupling device positioned between the shaft and an element to be driven by the shaft, the coupling device transmitting a rotational movement between the shaft and the element to be driven and decoupling a movement of the shaft in the radial direction.

9. The solid-state actuator drive apparatus according to claim 1, wherein the base element is a housing of a drive apparatus or a frame, and the housing or the frame securely connects the drive body to a base apparatus.

10. A solid-state actuator drive apparatus having a shaft having a shaft axis;

a pivot bearing;

a drive body;

at least two actuators to excite the drive body and the shaft relative to one other to cause the shaft to rotate relative to the drive body, the actuators being positioned on the shaft so that the actuators can rotate with the shaft; and a base element, on which the shaft, the pivot bearing, the drive body and the actuators are fixed, wherein either the drive body has a drive body opening and the shaft feeds into the drive body opening or the shaft is a hollow shaft, the drive body has an annular or discoid circumference and is disposed in the hollow shaft, the drive body is stationary relative to the base element, the actuators and/or the shaft are disposed on the pivot bearing and rotate relative to the drive body, and the shaft is positioned so that the actuators can change a position of the shaft relative to the base element in a plane perpendicular to the shaft axis of the shaft.

11. The solid-state actuator drive apparatus according to claim 10, wherein the drive body is securely fixed to the base element.

12. The solid-state actuator drive apparatus according to claim 10, wherein the drive body has two drive elements, each having a drive body opening, and the shaft acts together with the two drive elements.

13. The solid-state actuator drive apparatus according to claim 12, wherein the two drive body elements are connected to one another by a connecting element and are fixed to the base element by the connecting element.

14. The solid-state actuator drive apparatus according to claim 10, wherein the pivot bearing has two pivot bearing elements, and each pivot bearing element is coupled to the drive body by at least one of the actuators.

15. The solid-state actuator drive apparatus according to claim 14, wherein the two pivot elements are connected to one another by a connecting element and are movably coupled to the drive body via the connecting element and the actuators.

16. The solid-state actuator drive apparatus according to claim 10 further comprising a detection device to determine a torque acting on the shaft by determining loads acting linearly on the actuators.

17. The solid-state actuator drive apparatus according to claim 10, further comprising a coupling device positioned between the shaft and an element to be driven by the shaft, the coupling device transmitting a rotational movement between the shaft and the element to be driven and decoupling a movement of the shaft in the radial direction.

18. The solid-state actuator drive apparatus according to claim 10, wherein the base element is a housing of a drive apparatus or a frame, and the housing or the frame securely connects the drive body to a base apparatus.

* * * * *